(12) United States Patent
Park

(10) Patent No.: US 7,141,897 B2
(45) Date of Patent: Nov. 28, 2006

(54) ELECTRIC ACTUATOR EXPANDED WITH SENSOR AND ELECTRONIC BRAKE

(76) Inventor: Cheung-Geun Park, 242, Sangil-dong, Kangdon-gu, Seoul (KR) 134-837

(*) Notice: Subject to any disclaimer, the term of this patent is extended or adjusted under 35 U.S.C. 154(b) by 71 days.

(21) Appl. No.: 10/503,008

(22) PCT Filed: Jan. 27, 2003

(86) PCT No.: PCT/KR03/00171

§ 371 (c)(1),
(2), (4) Date: Mar. 28, 2005

(87) PCT Pub. No.: WO03/065562

PCT Pub. Date: Aug. 7, 2003

(65) Prior Publication Data

US 2005/0168078 A1    Aug. 4, 2005

(30) Foreign Application Priority Data

Jan. 29, 2002  (KR) .................. 10-2002-0005246

(51) Int. Cl.
*H02K 35/00* (2006.01)
*H02K 41/00* (2006.01)
*F16H 25/00* (2006.01)

(52) U.S. Cl. ................. 310/12; 310/15; 310/20; 310/68 B; 310/75 R; 74/89.23

(58) Field of Classification Search .......... 310/12, 310/15, 17–20, 75 R, 80, 68 B; 74/89.23, 74/89.25, 89.26, 89.321, 89.34, 89.4

See application file for complete search history.

(56) References Cited

U.S. PATENT DOCUMENTS

| 2,791,128 | A  | * | 5/1957 | Geyer et al. ................. 74/441 |
| 4,246,991 | A  | * | 1/1981 | Oldakowski ............ 192/223.4 |
| 6,158,295 | A  | * | 12/2000 | Nielsen ..................... 74/89.38 |
| 6,178,837 | B1 | * | 1/2001 | Nagai et al. .............. 74/89.23 |
| 6,791,215 | B1 | * | 9/2004 | Tesar ............................ 310/12 |
| 7,047,833 | B1 | * | 5/2006 | Durschmied ............. 74/89.32 |

FOREIGN PATENT DOCUMENTS

| WO | WO 1998/29674 A1 | 7/1998 |
| WO | WO 1999/02882 A2 | 1/1999 |
| WO | WO 2000/29760 A2 | 5/2000 |

* cited by examiner

*Primary Examiner*—Tran Nguyen
(74) *Attorney, Agent, or Firm*—Cohen, Pontani, Lieberman & Pavane

(57) ABSTRACT

An electric actuator that is capable of driving a motor in a cylindrical structure, such that the electric actuator itself can be expanded. The electric actuator includes: a motor for driving the electric actuator and a screw cylinder for connecting a shaft of the motor to a connecting part and for surrounding the external surface of the motor. The screw cylinder has right-handed and left-handed screw recesses formed thereon, and has first and second ball screw nuts. The first ball screw nut has a first electronic brake mounted thereon and the second ball screw nut has a second electronic brake mounted thereon, thereby enabling a non-stop reciprocating linear movement. An outside cylinder is provided with thrust bearings that are in contact with the first and second ball screw nuts, and is provided with a sensor that is disposed on the surface of a fixed part thereof for measuring the movement distance of the screw cylinder, thereby enabling the first and second electronic brakes to control the operations of the first and second ball screw nuts.

8 Claims, 6 Drawing Sheets

US 7,141,897 B2

ELECTRIC ACTUATOR EXPANDED WITH SENSOR AND ELECTRONIC BRAKE

RELATED APPLICATIONS

This is a U.S. National Phase Application under 35 USC 371 of International Application PCT/KR03/00171, filed on 27 Jan. 2003.

FIELD OF THE INVENTION

The present invention relates to an electric actuator, and more particularly, to an electric actuator that is capable of driving a motor in a cylindrical structure, such that the electric actuator itself can be expanded.

BACKGROUND OF THE INVENTION

A conventional electric actuator is moved on a fixed frame by using convey equipment that is attached thereon, within the length of the frame, such that it has no function of self-expanding like an oil hydraulic cylinder or pneumatic cylinder.

Moreover, the conventional electric actuator should stop by the application of the load according to the performance of its own motor, at the time of rotating in a backward direction.

SUMMARY OF THE INVENTION

One object of the present invention is to provide an electric actuator that has a function of self-expanding, driven by an electric motor and carries out a reverse rotation at a high speed without any stop.

This and other objects are attained in accordance with one aspect of the invention directed to an electric actuator that includes: a motor for driving the electric actuator and a screw cylinder for connecting a shaft of the motor to a connecting part and for surrounding the external surface of the motor. The screw cylinder has right-handed and left-handed screw recesses formed thereon and first and second ball screw nuts. The first ball screw nut has a first electronic brake mounted thereon, and the second ball screw nut has a second electronic brake mounted thereon, thereby enabling a non-stop reciprocating linear movement. An outside cylinder is provided with thrust bearings that are in contact with the first and second ball screw nuts and is provided with a sensor that is disposed on the surface of a fixed part thereof for measuring the movement distance of the screw cylinder, thereby enabling the first and second electronic brakes to control the operations of the first and second ball screw nuts.

BRIEF DESCRIPTION OF THE DRAWINGS

Further objects and advantages of the invention can be more fully understood from the following detailed description taken in conjunction with the accompanying drawings, in which.

DETAILED DESCRIPTION OF THE DRAWINGS

Now, an explanation of the preferred embodiment of the present invention will be given with reference to accompanying drawings.

Figure 1:
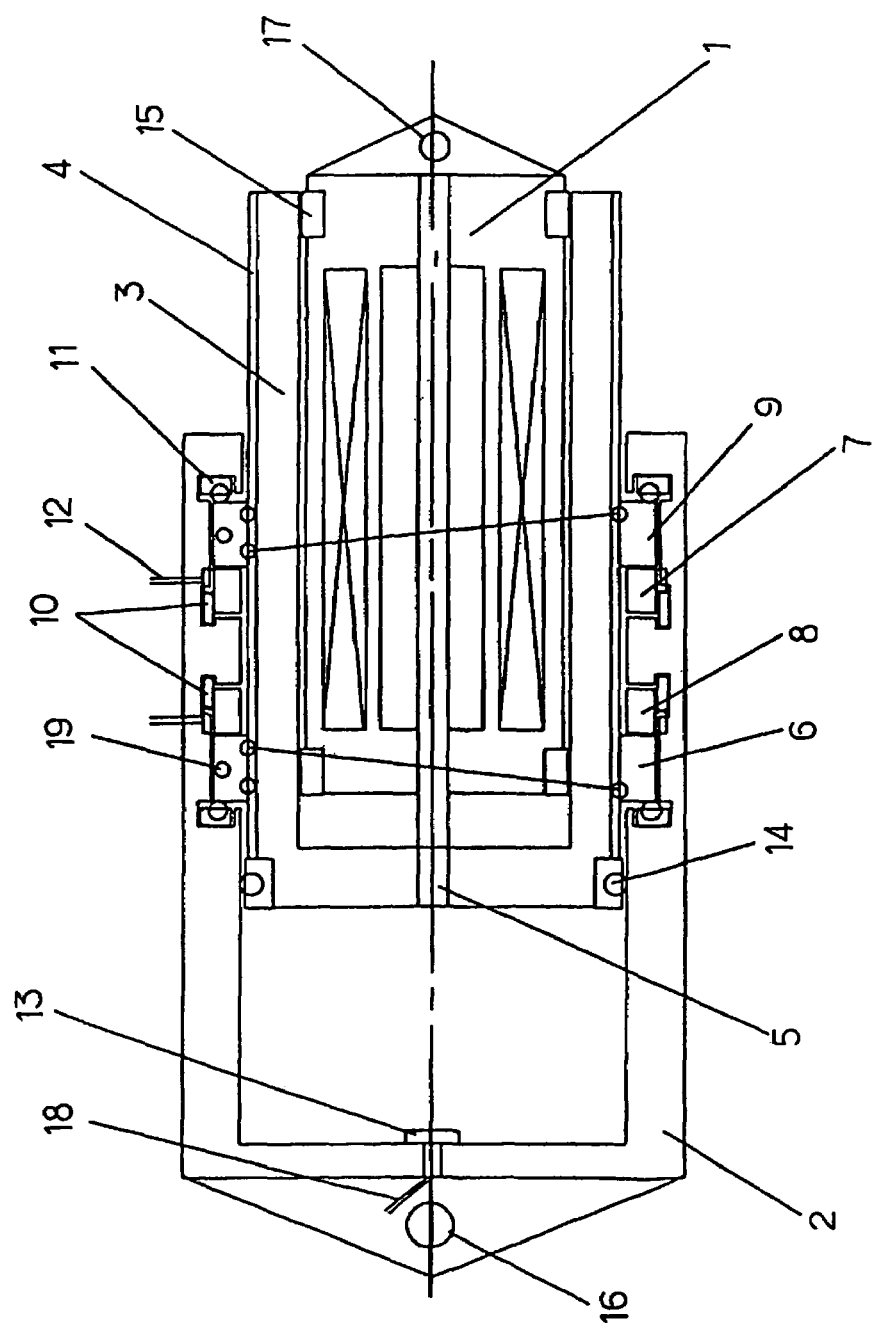
FIG. 1 is a front sectional view of the electric actuator of the present invention.
Figure 2:
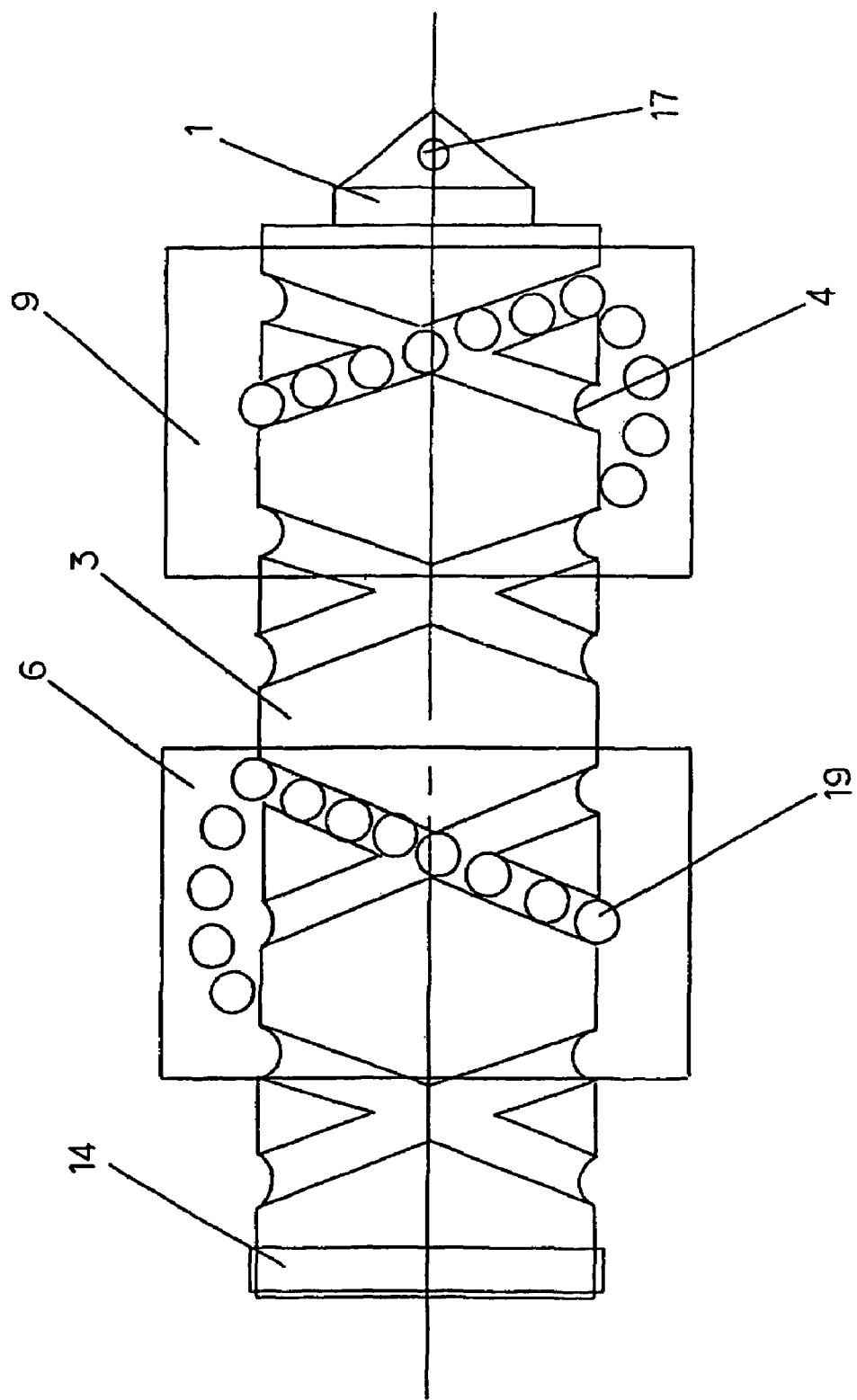
FIG. 2 is a view showing the structure for the screw recesses of the screw cylinder of the electric actuator.

As shown in FIG. 1, a motor 1 on which a fixed part 17 is mounted is connected to a screw cylinder 3 with the help of a connecting groove 5 coupled with the shaft thereof. Mounting the bearings 15 on the both sides of the outer surface of the motor 1 enables a motor case and the screw cylinder 3 to be all moved.

The screw cylinder 3 is provided with a ball bearing 14 on the both sides of the one end thereof for the purpose of smoothly moving an outside cylinder 2.

The screw cylinder 3 is also provided with screw recesses 4 formed thereon, through each of which a ball is guided. In this case, the screw recesses 4 are formed in such a manner that they start from the one end of the screw cylinder 3 and arranged in the directions of right-handed and left-handed screws in the condition where they are twice crossed to each other in the directions of the right-handed and left-handed screws during one rotation.

The outside cylinder 2 is provided with a first ball screw nut 6 that has the ball in the direction of the right-handed screw in the inner diameter thereof and a second ball screw nut 9 that has the ball in the direction of the left-handed screw in the inner diameter thereof. The first ball screw nut 6 includes a first electronic brake 8 mounted thereon, and the second ball screw nut 9 includes a second electronic brake 7 mounted thereon.

Figure 5:
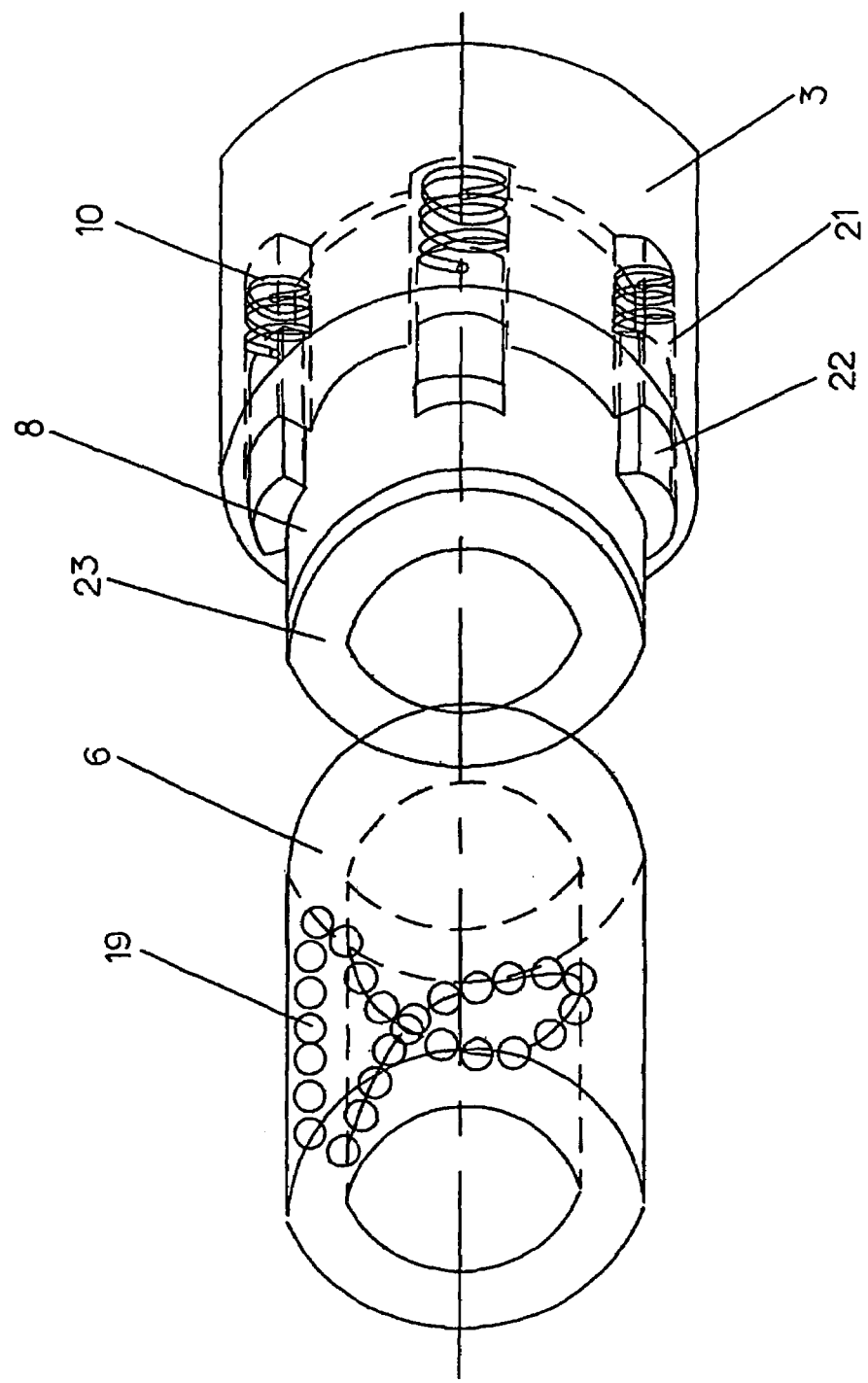
FIG. 5 is a detailed view showing the operating part of the electric actuator.

As shown in FIG. 5, the first electronic brake 8 is provided with sliding rods 22 and springs 10 on the lower portion of the sliding rods that are disposed to be separated at intervals of 90°, and the first ball screw nut 6 is formed in such a manner that the ball 19 is endlessly rotated in the size of one rotation.

Figure 4:
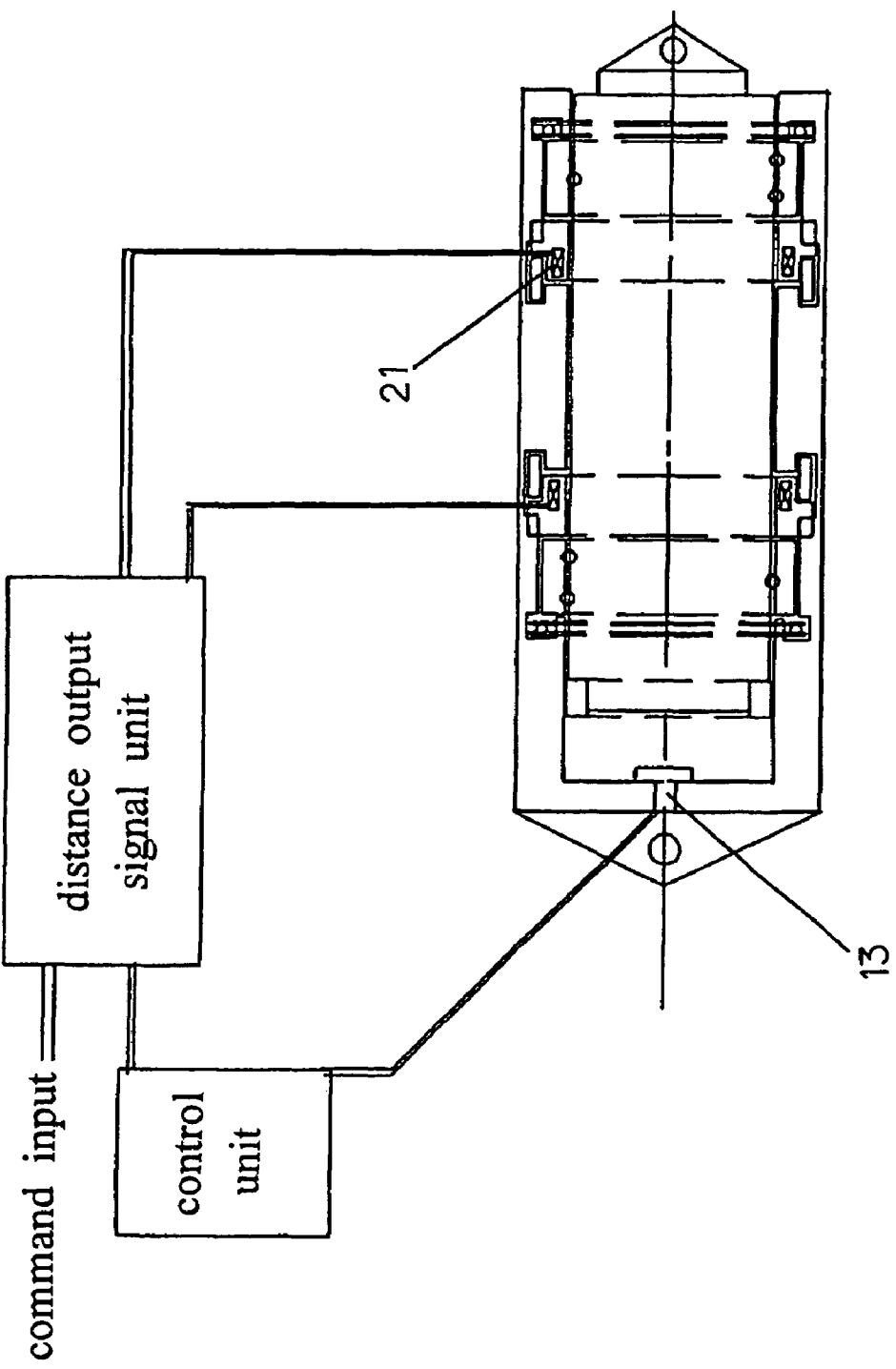
FIG. 4 is a view showing the structure for the sensor connected to a control unit.

As shown in FIG. 4, a sensor 13 connects its output line to a distance output signal unit and a control unit, and the first and second electronic brakes 8 and 7 are connected to the control unit, thereby building a command input circuit.

Now, an explanation of the operation embodiment of the electric actuator according to the present invention will be given.

Figure 3:
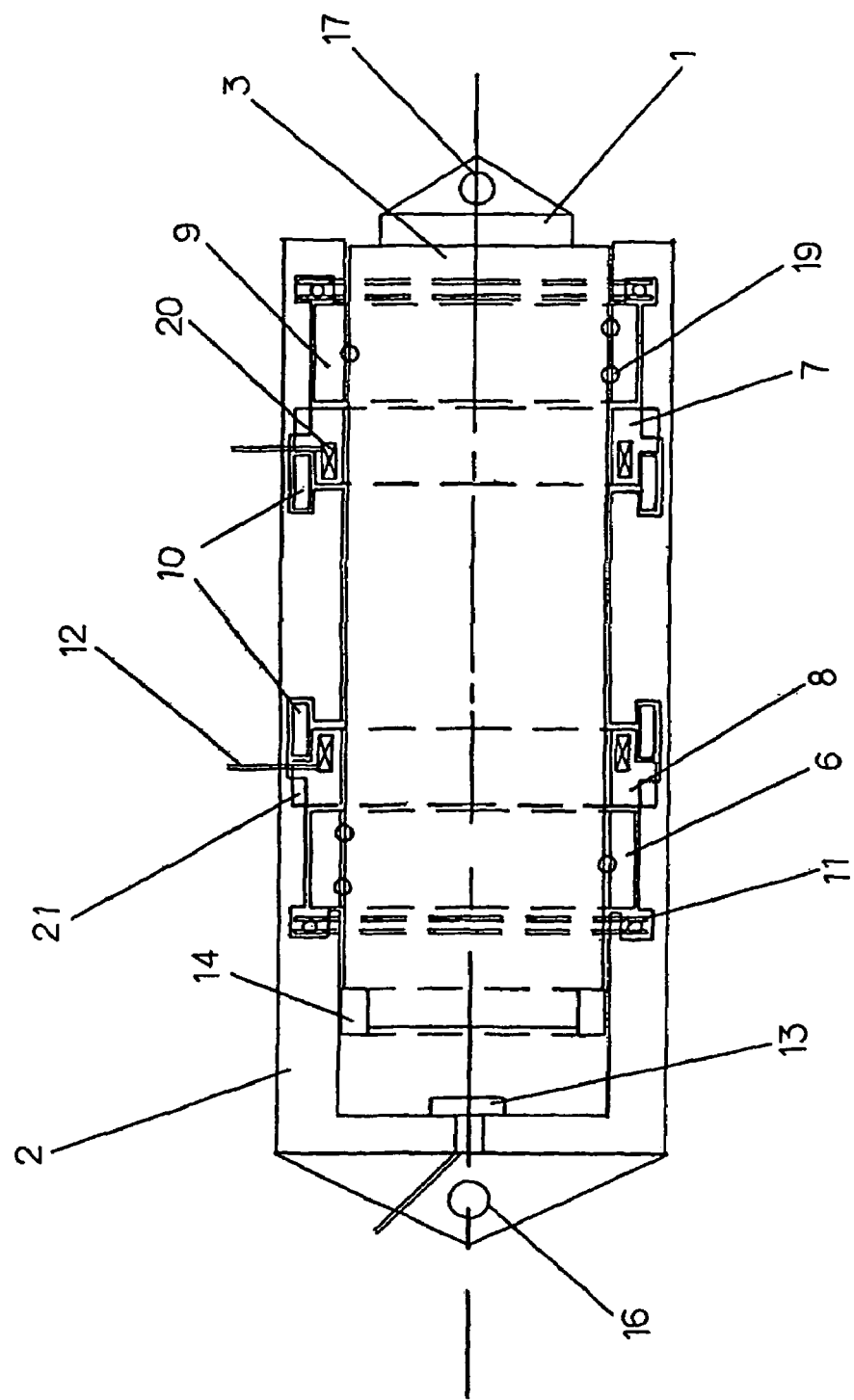
FIG. 3 is a sectional view showing an operation of the electric actuator.

As illustrated in FIG. 3, if the motor 1 is rotated in the direction of the right-handed screw at the front view of its shaft after the application of power to the first electronic brakes 8 and 7 is made, the screw cylinder 3 is rotated in the direction of the right-handed screw when viewed in the same direction. At this time, the motor 1 is in the fixed state by the fixed part 17.

If the application of the signal to the first electronic brake 8 stops while the screw cylinder 3 is being rotated in the direction of the right-handed screw, the first electronic brake 8 is moved along slide grooves 21 by means of the springs 10 thus to brake the first ball screw nut 6, with the result that the first ball screw nut 6 is fixed. Thereby, the first ball screw nut 6 with the ball in the direction of the right-handed screw receives the load applied according to the rotation of the screw cylinder 3 to transmit the pressure against a thrust bearing 11, such that the screw cylinder 3 is moved toward the sensor 13.

At this time, the sensor 13 transmits a measured distance signal to the control unit, which is used as next data information. If the screw cylinder 3 is to be moved in the opposite direction to the sensor 13, the power is applied to the first electronic brake 8 thus to enable an electric current to flow to the second electronic brake 7. Thereby, the second electronic brake 7 is operated by the springs 10, such that the second ball screw nut 9 is stopped. At this time, the screw cylinder 3 receives the load of the second ball screw nut 9 with the ball guided in the direction of the left-handed screw during its rotation and thus applies the load to the thrust bearing 11 that is in contact with the second ball screw nut 9, while the second ball screw nut 9 is stopped by the operation of the ball guided in the direction of the left-handed screw. As a result, the screw cylinder 3 is moved to the opposite direction to the sensor 13. In this case, the first ball screw nut 6 is freely rotated along with the screw cylinder 3, applying somewhat load to the thrust bearing 11.

If there is a need for stopping the rotation of the screw cylinder 3, the power to each electronic brake is cut off to thereby stop the operation of each ball screw nut.

When the power is cut off, in normal cases, limitations to the expansion of the electric actuator may occur, such that its generally original shape can be kept.

Figure 6:
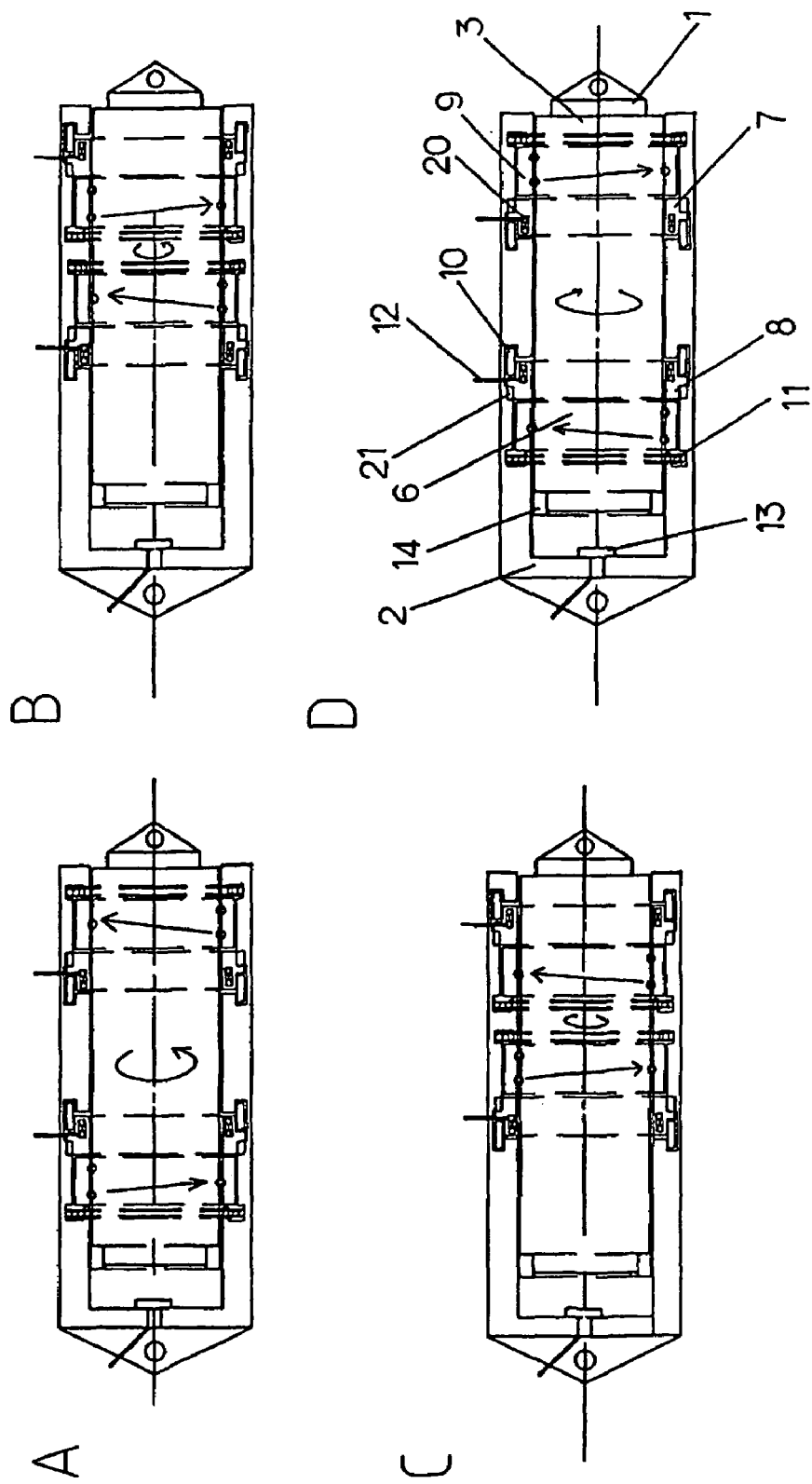
FIGS. 6A to 6D are views showing different arrangement types of the thrust bearings according to the rotating directions of the motor and the directions of balls of the ball screw nuts.

The thrust bearings 11 are differently arranged in accordance with the rotating directions of the motor 1 and the directions of the first and second ball screw nuts 6 and 9, which is illustrated in FIGS. 6A to 6C.

As shown in FIG. 6A, in the case where the motor is rotated in the direction of the right-handed screw, when the first ball screw nut 6 is disposed in the direction of the right-handed screw and the second ball screw nut 9 is disposed in the direction of the left-handed screw, the thrust bearings 11 are formed in the both sides of each of the first and second ball screw nuts 6 and 9.

As shown in FIG. 6B, in the case where the motor is rotated in the direction of the right-handed screw, when the first ball screw nut 6 is disposed in the direction of the left-handed screw and the second ball screw nut 9 is disposed in the direction of the right-handed screw, the thrust bearings 11 are formed in the insides of the first and second ball screw nuts 6 and 9.

In the same manner as above, in the case where the motor is rotated in the direction of the left-handed screw, when the first ball screw nut 6 is disposed in the direction of the right-handed screw and the second ball screw nut 9 is disposed in the direction of the left-handed screw, the thrust bearings 11 are formed in the insides of the first and second ball screw nuts 6 and 9, as shown in FIG. 6C.

Also, in the case where the motor is rotated in the direction of the left-handed screw, when the first ball screw nut 6 is disposed in the direction of the left-handed screw and the second ball screw nut 9 is disposed in the direction of the right-handed screw, the thrust bearings 11 are formed in the both sides of each of the first and second ball screw nuts 6 and 9, as shown in FIG. 6D.

As set forth in the foregoing, the electric actuator according to the present invention can eliminate the disadvantages that conventional electric actuators have had to thereby provide a novel one that is capable of self-expanding, which of course can be a part of artificial muscles. That is, the sensor 13 acts as a sensory nerve and the first and second ball screw nuts 6 and 9 act as a motor nerve, which makes nerves fed back. Therefore, the electric actuator of the present invention may be applied easily in the field of a robotics industry.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

I claim:

1. An electric actuator, comprising:
a motor (1) for driving said electric actuator;
a screw cylinder (3) for connecting a shaft of said motor (1) to a connecting part (5) and for surrounding the external surface of said motor (1), said screw cylinder having right-handed and left-handed screw recesses (4) formed thereon and having first and second ball screw nuts (6 and 9), said first ball screw nut (6) having a first electronic brake (8) mounted thereon and said second ball screw nut (9) having a second electronic brake (7) mounted thereon, thereby enabling a non-stop reciprocating linear movement; and
an outside cylinder (2) provided with thrust bearings (11) that are in contact with said first and second ball screw nuts (6 and 9) and provided with a sensor (13) that are disposed on the surface of a fixed part (16) thereof for measuring the movement distance of said screw cylinder (3), thereby enabling said first and second electronic brakes (8 and 7) to control the operations of said first and second ball screw nuts (6 and 9).

2. The electric actuator according to claim 1, wherein said screw cylinder (3) is disposed on the outside of said motor (1), for connecting the shaft of said motor (1) to said connecting part (5) to thereby transmit the rotational force of said motor (1).

3. The electric actuator according to claim 1, wherein said screw cylinder (3) is provided with a plurality of springs (10) and slide grooves (21) that are disposed on the inner periphery thereof, said plurality of springs and slide grooves being adapted to drive said first and second electronic brakes (8 and 7) to control said first and second ball screw nuts (6 and 9).

4. The electric actuator according to claim 1, wherein said screw cylinder (3) is provided with a bearing (14) on the both sides of the end portion thereof, respectively, for the purpose of smoothly moving said outside cylinder (2).

5. The electric actuator according to claim 1, wherein said motor (1) is provided with a bearing (15) on the both sides of the outside thereof, respectively, for the purpose of moving a motor case and said screw cylinder (3).

6. The electric actuator according to claim 1, wherein said thrust bearings (11) have different arrangements in accordance with the rotational directions of said motor (1) and the directions of the balls of said first and second ball screw nuts (6 and 9).

7. The electric actuator according to claim 1, wherein said sensor (13), which is disposed on the surface of said fixed part (16) of said outside cylinder (2), carries out the measurement of the movement distance of said screw cylinder (3), such that said first and second electronic brakes (8 and 7) control the operations of said first and second ball screw nuts (6 and 9).

8. The electric actuator according to claim 3, wherein said thrust bearings (11) have different arrangements in accordance with the rotational directions of said motor (1) and the directions of the balls of said first and second ball screw nuts (6 and 9).

* * * * *